United States Patent
Atefi et al.

(10) Patent No.: US 7,406,430 B2
(45) Date of Patent: Jul. 29, 2008

(54) METHOD AND SYSTEM FOR ASSESSING INFORMATION TECHNOLOGY SERVICE DELIVERY

(75) Inventors: Katayoun Atefi, Toronto (CA); Ralph James Foley, Beaconfield (CA)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 09/822,592

(22) Filed: Mar. 30, 2001

(65) Prior Publication Data

US 2002/0143606 A1 Oct. 3, 2002

(51) Int. Cl.
*G06F 9/44* (2006.01)

(52) U.S. Cl. ............................................. 705/7; 705/1

(58) Field of Classification Search .................. 705/10, 705/7, 1
See application file for complete search history.

(56) References Cited

U.S. PATENT DOCUMENTS

| | | | |
|---|---|---|---|
| 5,627,973 A * | 5/1997 | Armstrong et al. | 705/10 |
| 5,737,727 A * | 4/1998 | Lehmann et al. | 705/7 |
| 5,765,138 A * | 6/1998 | Aycock et al. | 705/7 |
| 6,249,769 B1 * | 6/2001 | Ruffin et al. | 705/7 |
| 6,327,571 B1 * | 12/2001 | Khayat et al. | 705/10 |
| 6,381,610 B1 * | 4/2002 | Gundewar et al. | 707/104.1 |
| 6,505,249 B1 * | 1/2003 | Rehkopf | 709/224 |
| 6,507,821 B1 * | 1/2003 | Stephanou | 705/8 |
| 6,738,736 B1 * | 5/2004 | Bond | 703/2 |
| 6,765,593 B2 * | 7/2004 | Simmons | 715/763 |
| 6,862,696 B1 * | 3/2005 | Voas et al. | 714/38 |

OTHER PUBLICATIONS

Burnstein, Ilene, Ariya Homyen, Robert Grom, C.R. Carlson. "A Model to Assess Testing Process Maturity". Illinois Institute of Technology, Nov. 1998 from Internet.*

Emm@, New E-Business Maturity Model Developed Jointly by PrincewaterhouseCoopers and Carnegie Mellon University, Delivers First Benchmarking Standard for Measuring E-Business Performance. Business Wire. New York; Jan. 6, 2000 from Proquest.*

Paulk, Mark C., Bill Curtis, Mary Beth Chrissis and Charles V. Weber. Capability Maturity Model for Software, Version 1.1 Technical report from Carnegie Mellon University, Software Engineering Institute, Feb. 1993. from Internet.*

(Continued)

*Primary Examiner*—Romain Jeanty
*Assistant Examiner*—Johnna Loftis
(74) *Attorney, Agent, or Firm*—John Pivnichny; Karuna Ojanen; Hamre, Schumann, Mueller & Larson, P.C.

(57) ABSTRACT

A system and method of assessing the delivery of information technology (IT) service delivery from a providing organization to a customer. The system and method include techniques for assessing the maturity of the information technology services and for identifying factors which cause or contribute to a customer's perception of poor service. The present invention focuses on the customer and what he sees, rather than on the internal processes used by the IT organization to develop and deliver services to the customer. That is, the present invention is a system which focuses on the "delivery" aspect of IT services rather than on the "production" aspects of the IT activities within the IT shop.

17 Claims, 6 Drawing Sheets

OTHER PUBLICATIONS

Daskalantonakis, Michael K. Achieving Higher SEI Levels. Motorola, Inc., Sep. 1994. ☐☐from http://www.stsc.hill.af.mil/crosstalk/1994/09/xt94d09e.asp☐☐first appearing in IEEE Computer, vol. 27, No. 7, pp. 17-24, Jul. 1994.*

Software Capability Evaluation Version 2.0 Implementation Guide, CMM-based appraisal project, Feb. 1994. from www.sei.cmu.edu.*

Curtis, Bill. Hefley, William E. Miller, Sally. Overview of the People Capability Maturity Model. Sep. 1995. from www.sei.cmu.edu/cmm-p/.*

Hefley, William E. Curtis, Bill. People CMM—Based Assessment Method Description, Version 1.0. Aug. 1998. from www.sei.cmu.edu/cmm-p/.*

* cited by examiner

Fig. 1

*ASSESSMENT CONTENTS*

| ENGAGEMENTS / APPROACHES | | Generic Matrix | Simple Question | Detailed Questions | Detailed Matrixes |
|---|---|---|---|---|---|
| | Quick, general assessment 210 | ✓ | | | |
| | Medium depth assessment 212 | ✓ | ✓ | | |
| | In depth assessment – interview based 214 | | | ✓ | |
| | In depth assessment – workshop based 216 | | ✓ | | ✓ |

Fig. 2

| | Ad Hoc (1) 302 | Repeatable (2) 304 | Consistent (3) 306 | Exceptional (4) 308 | World Class (5) 310 |
|---|---|---|---|---|---|
| 312 | Little understanding of service purpose or objectives. Ill defined procedures. | General awareness but purpose not understood. Standard methods or practices are sometimes used. | Service purpose and goals understood and agreed to by most. Standard methods and practices are used. Customer needs are Reviewd periodically. | Service purpose and goals are understood, agreed to and the focus of all. Standard and flexible practices are used. Customer needs are Reviewed regularly. | Service purpose and goals are the primary focus of all. Standard, flexible and just in time practices are used, with innovation rewarded. Customer needs are anticipated. |
| 314 | Provider personnel do not act as a "team", do not understand assignments or operate efficiently. Different measurements within groups. | Teaming is evident, although inconsistent. Responsibilities are defined. Ownership is established. | Teams established., with good rapport. Aversion to risk taking, although some adaptability evident. | Teams established, with good internal and customer rapport. Process from team experiences and to remove team barriers. Risk taking valued and encouraged. | Team established with Customer part of team. Team performance Continuously optimizing through empowerment and incentives and used for continuous improvement. Risk taking rewarded. |
| 316 | Delivery is inconsistentand Unsatisfactory. | Delivery is repeatable. Quality is random. | Deliver is consistent and repeatable. Quality is inspected and controlled. Service is accessible primarily to suit the provider. | Deliver is consistent, repeatable and planned. Quality is planned and assured. Service accessibility is somewhat flexible for the customer needs. | Delivery is consistent, predictable and optimized. Quality is managed and assured through continuous improvement. Service available on a "just in time" basis. |
| 318 | Inconsistent management of the service. No plans for improvement. | Exposures are Identified and defined. | Serious weaknesses have been corrected. Defects are reviewed regularly. | Service is competitive and adaptable. Continuous review of defects. | Best of breed, superior to competitors. Defect free. |
| 320 | Results are not measured. | Results inconsistently measured. Generally poor. | Results measured and Generally customers are Satisfied. | Results measured and customer expectations Are sometimes exceeded. | Customers are delighted and their expectations always exceeded. |

Fig. 3

| Service Attribute | Focus Area | Description and Considerations | Example |
|---|---|---|---|
| Definition and Understanding of the Service | 410— Is the service defined? | A service is defined in terms of its specific deliverables, inputs and key activities. Delivery requirements, customer preferences, restrictions, and the like are typically required. | Perhaps the service is defined via service agreements, or thoroughly via service documentation. One page summaries and little focus on ensuring understanding - both on the part of the supplier or the |
| | 412— Are the levels of delivery defined? And understood? | Is there a clear definition of the service levels? Is there a common understanding of service/service levels between the service provider and customer? Is there an analysis of and balance between customer needs and delivery capabilities? Policies clear and Understood? | For instance, customer expects that problem resolved 7/24, however service provider resolves a specific type of problem (e.g. infrastructure problems of high severity regular working hours. |
| | 414— Is the scope of the service defined? | Are inclusions and Exclusions clear? Agreed to by all Parties? Documented? | Perhaps Move/Add/Changes are part of But new installations are done through |
| | 416— Are service objectives defined? | The objectives should Be SMART i.e.. Specific, Measurable, Aggressive, Realistic And Time based. | ▪ To deliver a help desk service which serves customer needs is a wrong way of define objectives.<br>▪ To respond to customers Move/Add/Changedesktop requests within 1 business day receiving the request is an example of objective |
| | 418— Is the service usage defined and clear? | Do the providers Know how the service Is used, or The users know how It is intended to be Used? When is the Service used- | The service may be designed for relative usage – e.g. Installation of workstation user, but not be designed to support the large number of workstations for a large of users. |

LEVELS OF MATURITY 520, 530

| | | Service Assessment Matrix | | | | NOW | GOAL |
|---|---|---|---|---|---|---|---|
| | Service Attribute | Ad Hoc (1) | Repeatable (2) | Consistent (3) | Exceptional (4) | World Class (5) | |
| | | Foundation – Understading the Service and Customer | | | | | |
| S E R V I C E | Definition of Service | No Agreement or understanding of the service or its purpose. | General awareness of the service mission, but it is not fully understood by all participants. | Mission is defined by provider, and agreed to by most IT and user responsible personnel. It is understood by most. | Mission is defined, understood, agreed to and certified by customer and provider. It reflects the objective of | Defined, understood and promoted by all. Mission is consistent with IT and the business view of the contribution and role of the service. | |
| | | Executing the Service | | | | | |
| | Quality | Typically the service is not complete. Essential items are | Occasionally complete service is delivered. Evidence that the job is not | Essential elements are typically delivered, but this is difficult to prove. Little focus | Focus is on providing a complete service from user and provider point of view. | Provided Service is always complete. Customers rarely complain. Assembles networked knowledge workers needed to | |
| | | Supporting the Service | | | | | |
| A T T R I B U T E S | Marketing & Communications | Little or no communicating on the content of the service, how to access, and where to get support | Some communications for new services. Primarily on how to use, less on how to optimize and why. | Only sales and marketing have access to the customers and the market. Many employees may not understand how their | Encourages direct contact between customers and provider management. | Recognize that marketing is needed to ensure all other efforts are effective. The environment encourages and supports employees learning from | |
| | | Measuring and controlling the Service | | | | | |
| | Achaieve | No reports or data is available to indicate results. Some evidence of poor results | Rely primarily on customer complaints. Cannot directly relate to objectives. | IT formulated measurements which in general are being achieved. Little feedback to users and provider. | IT and Customer based measurements wich are being exceeded in many cases, although not in a consistent | Exceeding objectives in all aspects. Continually revising measurements and raising the bar. Provide feedback on eacch component of service delivery. Reduces cycle time. | |

METHOD AND SYSTEM FOR ASSESSING INFORMATION TECHNOLOGY SERVICE DELIVERY

CROSS REFERENCE TO RELATED PATENTS

The present invention is related to the following documents, all of which are assigned to the assignee of the present invention and which are specifically incorporated herein by reference:

patent application Ser. No. 09/625,108 filed Jul. 25, 2000 by Steven D. Barnes et al. and entitled "Method and System for System Integration", a document which is sometimes referred to in this document as the SI Patent.

patent application Ser. No. 09/506,260 filed Feb. 17, 2000 by Brenda Barth-Harvey et al. and entitled "Automated Management Process for Enterprise Resource Planning System Implementation", a document which is sometimes referred to in this document as the Management Process Patent.

BACKGROUND OF THE INVENTION

1. Field of the Invention

The present invention relates to a methodology that may be embodied in engagement templates for assessing delivery of information technology (IT) services to customers. More particularly, the present invention includes an improved system and method for evaluating the maturity of the IT service delivery system and for identifying factors which cause or contribute to a customer's perception of poor service. One embodiment of an engagement template includes an IT service matrix which rates the service in several key attributes according to a level of maturity and increasing customer satisfaction.

2. Background Art

The description of the present invention which follows is based on a presupposition that the reader has a basic knowledge of information technology (sometimes referred to as data processing) and the delivery of IT services to customers, whether the customers are members of the same corporate organization as the IT organization (in a captive IT facility) or in an outsourcing organization which is hired to provide IT services to a corporate organization (sometimes the IT function is partially outsourced and partially performed in-house). Such IT organizations frequently involve a significant cost to the corporation. This significant cost sometimes raises the question of whether the IT organization is worth the expense and whether it can be improved, which often entails a consulting engagement by an outside organization to review the IT services, identify weaknesses and propose changes which will deliver better IT services or reduce IT costs or some combination of the two.

One approach to evaluating the effectiveness of an IT operation is to focus on the processes and procedures which are employed by the IT operation itself. This is sometimes referred to as a production method, since it focuses on the production of IT deliverables in assessing the effectiveness and the adequacy of the IT operation. This is also an inwardly aligned evaluation does assist in evaluating the efficiency of the IT infrastructure by aligning the goals and initiatives across the enterprise's processes. It allows an emphasis on repeatability, consistency and robust process execution across the enterprise.

However, process assessment (looking at the processes used in the IT organization) may be a useful indicator of IT effectiveness but it is not as good an indicator of the satisfaction and value as perceived by the users of the IT services (the external customers who are using the IT services being provided by the IT organization).

Thus, the prior art systems for assessing information technology delivery systems have undesirable disadvantages and limitations which impact the effectiveness of the assessments and limit the scope of recommendations for improvements.

SUMMARY OF THE INVENTION

An embodiment described herein overcomes the disadvantages and limitations of the prior art systems by providing a simple, yet effective engagement model to assess the effectiveness of an information technology organization and for making suggestions to improve the effectiveness of the IT services in the future.

An embodiment of an engagement template of the engagement model uses a matrix of key factors and levels of satisfaction to determine where the current information technology organization is and where the customers would like it to be in the future. This matrix may be in the form of a generic matrix for all service assessments and allow for a quick and relatively simple assessment of the IT service.

The engagement model may also have another engagement template comprising a detailed set of questions to enable a detailed analysis of each of several service characteristics and attributes, allowing for a more in depth assessment of the IT service.

Yet another embodiment of an engagement template may include detailed service assessment matrices including one for each service characteristic, with a row for each service attribute. These detailed assessment matrices allow for an even more detailed analysis of the IT service and providing of the most detailed and intensive analysis.

Different embodiment of engagement templates are not mutually exclusive, they allow for the mixing and matching. Under some circumstances, some of the templates may be used for parts of the analysis (for example, detailed matrices) for intensive analysis coupled with a set of questions for an analysis of other factors which is less intense.

The engagement templates described herein also have the advantage that they focus on the perception of the customers in evaluating the effectiveness of the IT delivery system and are therefore sometimes characterized as an evaluation of the delivery or outward manifestation of the IT system rather than an inward evaluation of the production system.

The The engagement templates described herein also allow for recommendations to be made for improving the perceived effectiveness of an IT system. That is, based on the users' perceptions of the IT service, recommendations can be proposed for improving the service and increasing the perceived effectiveness of the IT delivery system.

Once the level of maturity has been identified for various service attributes using one or more of the engagement templates described herein, improvements to the service regarding one or more attributes can be proposed. A further advantage of the engagement templates as embodied herein is that they allow a clear understanding and communication of who the customers are and the effective value (as perceived by the customers) of the IT service being delivered to them.

The engagement templates and the analyses provided by them promote alignment of the IT services with the business. They provide insight in to the "why" of activities and a base of agreement between the IT service supplier and the recipient of IT services, also referred to as the customer.

Embodiments of the engagement templates as described herein avoid the use of an inward or production focus in which the activities of the IT service provider are the chief focus of the analysis.

The engagement templates have at least three related embodiments for assessing the delivery of the IT services provided to a customer—(1) a generic assessment matrix which can be used to perform a quick and relatively simple analysis of the IT service; (2) detailed questions and directions for each service characteristic and attribute treated in this technique; and (3) detailed assessment matrices including a matrix for each of the service characteristics. The detailed questions of (2) provide a system which contains questions containing guidance and background for the context of the assessment matrices to assist in explaining the context and target of the various assessment attributes. The questions can be used in interviews and result in a slide show used during customer workshops to perform a medium depth assessment of the IT service delivery. The detailed assessment matrices outline different levels of implementation of each of the service attributes (five levels in the representative example) and the matrices can be used during interviews or workshops or even as a general education on IT services.

Other objects and advantages of the present invention will be apparent to those skilled in the relevant art in view of the following description of the preferred embodiment taken together with the accompanying drawings and the appended claims.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which:

FIG. 3 is a matrix of different service attributes versus different level of customer satisfaction, as an example of a general IT service maturity assessment matrix;

FIG. 4 is a sample of service assessment questions for a service attribute;

FIG. 5 is a sample of an IT service maturity assessment matrix; and

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
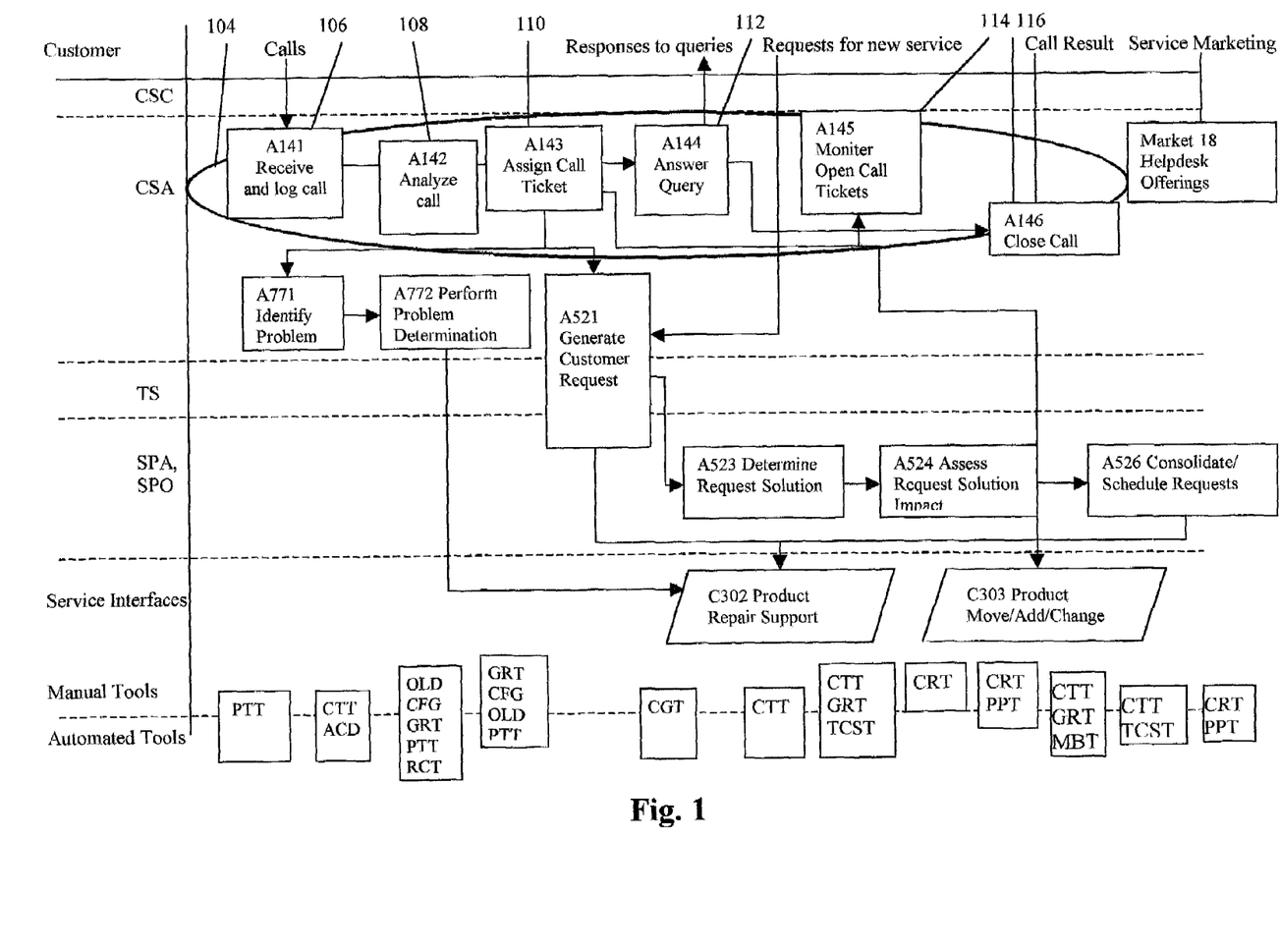
FIG. 1 is a block diagram illustration the distinction between IT services and IT processes which is useful in understanding the present invention and its environment.

FIG. 1 shows a process chart (for a single, yet representative process in a business activity) in an effort to illustrate the difference between and IT service and an IT process. An IT service may be defined as a specific IT function or output which provides customer value. It is a measurable "product" which is the basis for doing business with a customer and is delivered through a series of implemented business processes and/or activities. An example of an IT service is illustrated as "response to queries" identified as 102 in FIG. 1.

An IT Process is a collection of related activities that take inputs, transforms them, and produced outputs that support an enterprise goal. Implemented processes are enable through people, tools, and information. An example of an IT process (related to call management in the customer service or CSA function) is identified in FIG. 1 by the ring 104 which includes a block 106 where the call is received and logged, a block 108 where the call is analyzed, a block 110 where a call ticket is assigned, block 112 where the query is answered, a block 114 where the open call tickets are monitored and a block 116 where the call is closed. The remainder of FIG. 1 illustrates other levels of service and processes and identify the tools, both manual tools and automated tools which are used in the performance of the processes.

It would be useful at this time to provide a definition of two other terms which are used throughout this document: An activity is a specific collection of tasks organized around a commonly understood result, typically executed in a prescribed sequence. A service flow is a description of all the activities, in sequence, required to deliver a service. It includes the interprocess flows.

The various embodiments described herein can be considered as embodiments of engagement templates of an engagement model as set forth in U.S. Pat. No. 6,950,802 B1 entitled SYSTEM AND METHOD FOR SYSTEMS INTEGRATION to Barnes et al., incorporated by reference. The specific methodological component such as the engagement model and the engagement templates described herein may be implemented as a database, such as a relational or hierarchical database, or as a knowledge-based system, or the like, which may be accessed and manipulated by way of a browser or some other user terminal application via the Internet, intranet or some other network. Access to various elements, including databases, records, pages, documents, fields, and so forth and parts thereof may be controlled by way of access control lists (ACLs), such as is implemented in LOTUS NOTES ™ and DOMINO™, or the like. Also, these database elements may be distributed as database instances among several sites in support of distributed development and market engagement teams, and synchronized using, for example, LOTUS NOTES™ replication techniques to maintain consistency among the various instances.

An engagement model acts as a template for a particular type of project and is a pre customized method to support a specific service offering or a specific type of engagement. An engagement model can have one or more engagement templates, i.e., an engagement template is a specific instance of an engagement model which means that it is the result of tailoring an engagement model for use.

An important phase of systems integration monitors and manages specific client or customer engagements and involve applying measurements and metrics for such parameters as customer satisfaction. The metrics and measurements may be collected across actual engagements utilizing engagement templates as described herein. Engagement templates may be embodied as the various relationship matrices as further described herein. The relationship matrices may depict the relationships between the customer and various deployment units, such as data deployment units and execution deployment units, of the information technology service provider.

Figure 2:
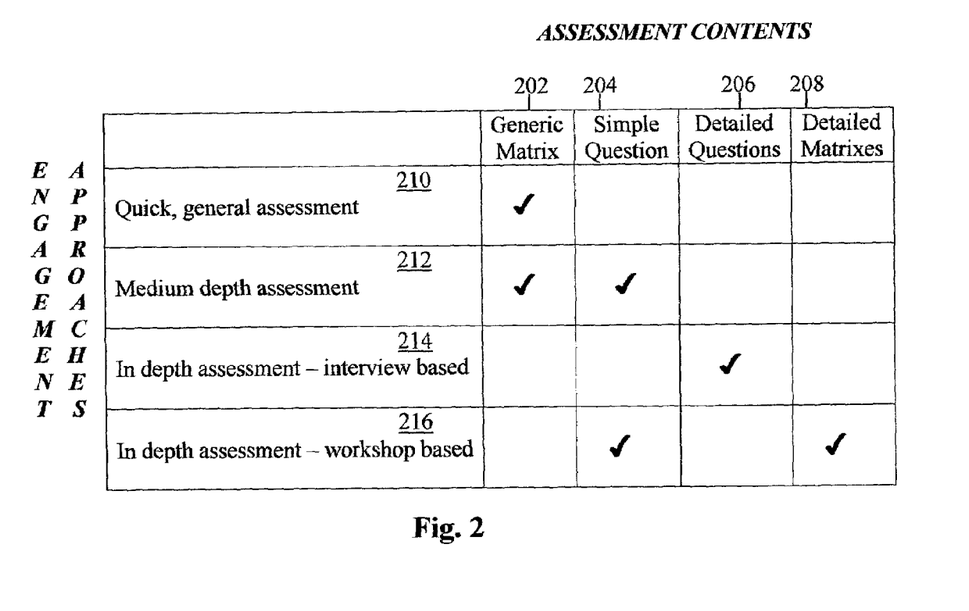
FIG. 2 is a matrix of different engagement approaches with different type of assessment techniques to illustrate different approaches to analysis of IT services.

FIG. 2 is a chart which illustrates different engagement approaches and the use of different tools in completing an assessment. Across the top of the chart are the different tools available for use in an assessment and down are different types of assessments which can be performed. The different types of tools include (but are certainly not limited to) a generic matrix identified as column 202, simple questions in column 204, detailed questions in column 206 and detailed matrices in column 208. Several engagement approaches or types of analyses are listed going down the page: a quick, general assessment in line 210, a medium depth assessment in line 212, an in-depth, interview-based assessment in line 214 and an in-depth, workshop-based assessment in line 216. The respective assessment components which might be chosen for each of these yes of engagement approaches is illustrated by a check mark in the intersection of the column and line (or row) in the chart of FIG. 2.

FIG. 3 is a simple matrix showing different levels of IT service maturity based on key attributes, with five categories being shown in this matrix. Five columns are shown in levels of increasing maturity, from ad hoc in column 302 and repeatable in column 304 to consistent in column 306, exceptional in column 308 and world class in column 310. Going down the page, a first line or row 312 deals with policies and procedures, a second row 314 deals with team work, a third row 316 deals with consistency of delivery, a fourth row 318 deals with defect handling and a fifth row 320 deals with use of results. For each row, an example of each level of maturity is provided for each attribute. as a result of assessing the maturity, an IT organization may have different levels of maturity for different attributes. The difference may result from different priorities or differences in implementation, but, in general, the goal is to reach a higher level of maturity for each attribute and to improve on those attributes where the results are relatively less mature. So, an organization which has exceptional results in most categories may wish to focus on those where the results are merely consistent while an organization which is at the repeatable level may have an attribute in which it exhibits "consistent" results and would be more concerned about other areas. Obviously as the organization moves to the right in FIG. 3 it is increasing customer satisfaction, moving from meeting customer expectations in the middle to exceeding customer expectations at the right (and falling short of customer expectations to the left)—all at a price of course, and some organizations and some customers are not willing to pay for world class services, at least in some areas.

The number of key attributes in a matrix of the type used in an assessment using the system of FIG. 3 may have between ten and twenty attributes, although a lesser number or a greater number could be used to advantage. One focus in this process is to determine whether the provider and the customer have a common understanding of the scope and objective of the IT service being provided and to identify any disparity between the expectations.

FIG. 4 illustrates sample set of detailed assessment questions to provide a more detailed insight into the various attributes than is provided by the matrix of FIG. 3. In this case, the detailed assessment questions are provided for only one service attribute, in this case "definition and understanding of the service", as an illustrative example of a part of the set of questions. A similar set of questions would be provided for other service attributes (and there may be many such service attributes). In each case, there is a focus area (column 404) associated with each attribute (listed in column 402) along with a set of descriptions and considerations in column 406 and an example in column 408. For a single service attribute there will usually be several focus areas, each set forth in a line in FIG. 4, such as lines 410, 412, 414, 416 and 418. Thus, in line 414, the focus area is whether the scope of service is defined and the considerations in column 406 include where the service inclusions and exclusions are clear, agreed to by the parties and documented. The answers to these questions will lead the assessment to a determination of the level of maturity as well as identifying areas for improvement. For example, if there is a disagreement on the scope of the service between the provider and the customer, it will be hard to have a mature service and the remedy suggested may be that the provider and the customer agree on the scope of the service and document it. One key aspect to assessing a service is to note the gap between the reality and the perceptions as seen by the customer and by the provider.

FIG. 5 is a third example of an assessment approach where detailed matrices are provided for assessing the level of maturity of a service. FIG. 5 is similar to FIG. 3 in providing different levels of maturity across the horizontal columns and a service attribute in the vertically-arranged rows but FIG. 5 is meant to provide a more detailed set of attributes and allow for an identification of the current level of service (labeled as "now" in column 510) as well as a desired level of service in column 520, (labeled as "goal"). A comparison of the "now" results with the "goal" for each service attribute can lead quite easily to conclusions about areas for improvement (where the now level of service is less than the goal level of service) as well as areas for possible economy (where the now level of service in column 510 exceeds the goal level of service in column 520). In short, the IT organization should be using resources in areas which are important to the business objectives of the organization and not on achieving results without regard to the priorities of the organization. In this manner, the objectives of the IT organization in delivering its services may become better aligned with the objective of the organization as a whole.

Figure 6:
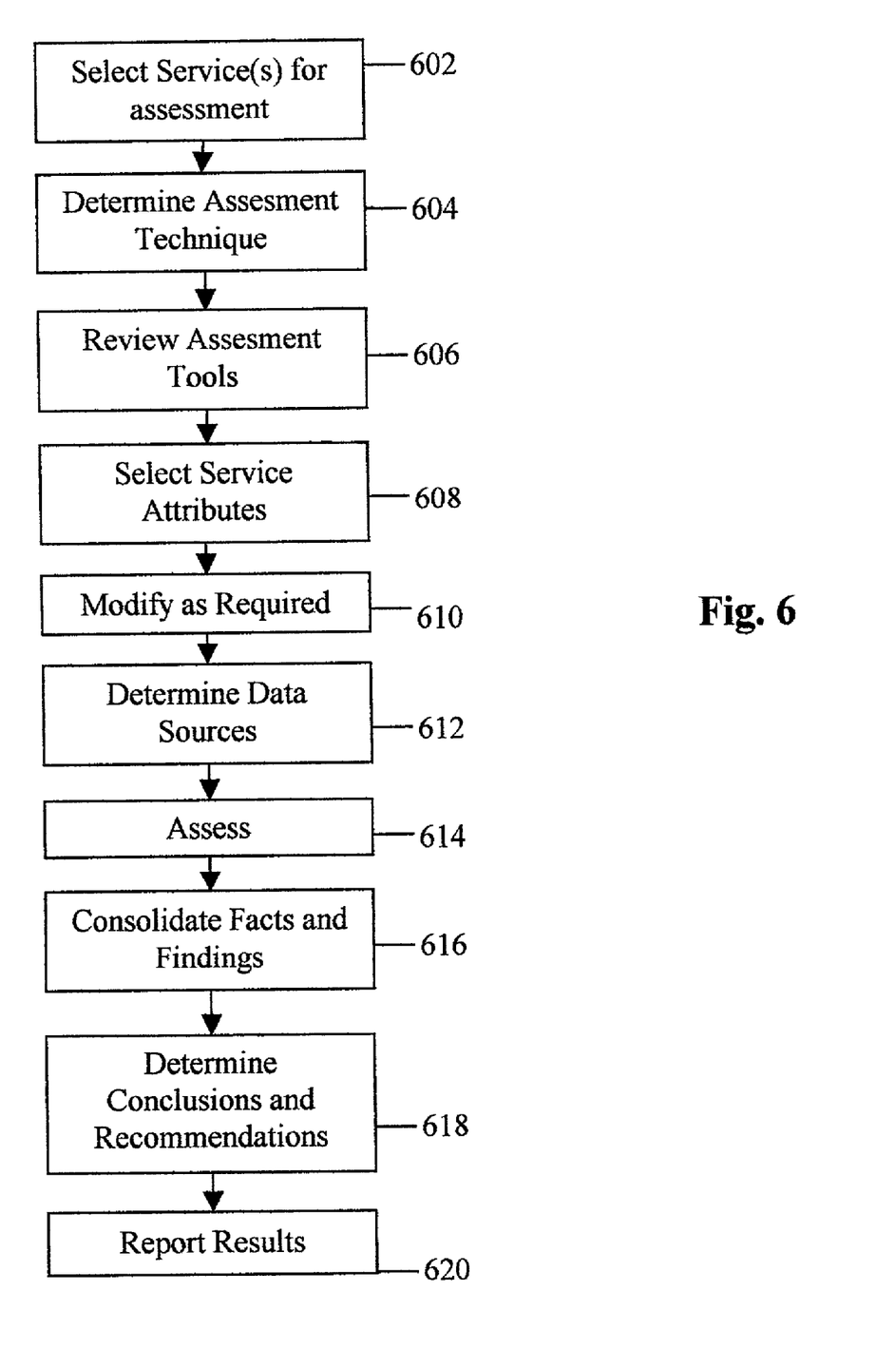
FIG. 6 is a logic flow chart of the process used to assess the IT service (or a component thereof) using the present invention.

FIG. 6 is a flow chart illustrating the logical flow of the information technology service assessment of the present invention using the elements and tools described above to provide an analysis of the current state of IT service and recommendations for improving the service. Starting at block 602, the consultant and the customer identify the service or services which are to be assessed. This may be the entire IT operation with all of its many services or a selected subset of those services, based on the time and money available for study or a perception of things which are in greater need of attention. For example, an IT service may provide data processing applications for invention control, financial reporting, payroll and computer aided design and manufacturing (CADAM), among other applications. If the cost in time and effort is too great to analyze all of the foregoing, it may be determined that inventory control has the greatest potential for service improvements and other benefits to the business and that service may be analyzed first.

Next, at block 604, the consultant determines the assessment technique(s) to be used. This may be a generic matrix as presented and discussed in connection with FIG. 3, detailed questions as presented and discussed in connection with FIG. 4, detailed matrices as discussed in connection with FIG. 5 or some combination of the techniques. Thus, in an example, the consultant has two formats (matrices and questions) available and each is available in a simple form and in a detailed form, although in practice, multiple levels could be developed between the simple and the detail to accommodate any desired level of analysis. At block 606 the assessment tools are reviewed and appropriate tools are selected for the assessment. Next, the service attributes are selected at block 608 and modified at block 610 to fit the circumstances. Depending on the type of service being assessed and the level of that assessment, it may not be necessary to ask all the questions for an attribute or to evaluate all the attributes of each service. For example, services such as "ensuring availability of servers" may not need to focus on a human interaction as much as a services which relies on people for the delivery of that service.

At block 612 the data sources are determined and at block 614 the services are assessed using the selected technique—either the matrix or questions. It is essential to understand the views of the provider and the customer in doing the assessment, but the information may be captured through various techniques. Where workshops are the preferred means of gathering information, then matrices may be more suitable. Where customer viewpoint's are sought by questions, it may be necessary to reword the questions to make them understandable by the customer—preferably in language which is easily understood by the customer being interviewed.

Following the gathering of information in the assessment of block 614, the facts and findings are consolidated at block 616, recommendations and conclusions are set out in block 618 and the results are reported at block 620.

Of course, many modifications of the present invention will be apparent to those skilled in the relevant art in view of the foregoing description of the preferred embodiment, taken together with the accompanying drawings. For example, the present invention is not limited to the types of analysis tools which are described above and other tools may be used in addition to or in place of the matrices and questions disclosed. For example, a customer may maintain a log which provides useful information regarding the customer complaints and praise for the IT services and this log may provide some useful information and avoid having to ask questions about the state of the IT service as perceived by the users. The levels of service may also be an indicator of the satisfaction or dissatisfaction with the IT services. Some of the features and elements of the present invention may be useful without the corresponding use of other features and elements. Additionally, many modifications can be made to the system implementation and the method of presenting conclusions and recommendations. Accordingly, the foregoing description of the preferred embodiment should be considered as merely illustrative of the principles of the present invention and not in limitation thereof.

Having thus described the invention, what is claimed is:

1. A computerized method for evaluating the satisfaction and value of information technology services as perceived by an external customer using information technology services provided by an information technology organization, the method comprising the steps of:

connecting the external customer to a collection of databases, the collection of databases comprising an engagement model database, an engagement family database, and an engagement template database;

retrieving a first engagement template from the engagement template database;

presenting a plurality of user interfaces of the first engagement template to the external customer whereby the external customer provides input data on a plurality of information technology service attributes, the information technology service attributes comprising:

understanding the external customer and a purpose and objective of the information technology service to the external customer;

an extent to which the information technology organization providing the services and the external customer function as a team;

a consistency with which the information technology organization executes and delivers the services to the external customer;

an extent to which the information technology organization manages and improves and supports the information technology services delivered to the external customer;

a degree to which a delivery of the information technology services are measured and satisfy the external customer's expectations;

presenting additional user interfaces having a focus area of the service attribute, a set of descriptions of the service attribute, a set of considerations of the service attribute, and an example of the service attribute;

retrieving a second engagement template from the engagement template database;

presenting a plurality of user interfaces of the second engagement template to the external customer whereby the external customer can provide input data, the second engagement template comprising an assessment matrix having a plurality of rows and columns, each row corresponding to a respective one information technology service attribute selected from the group of policies and procedures, team work, consistency of delivery, defect handling, and use of results, and each column corresponding to a respective one level of maturity of the information technology service attribute selected from the group of ad hoc, repeatable, consistent, exceptional, world class;

providing metrics of the external customer's satisfaction of each information technology service attribute determined by the external customer's input data pertaining to each information technology service attribute in response to the first engagement template; and providing metrics of a degree to which the external customer and the information technology organization have a common understanding of a scope and objectives of the information technology services;

identifying any disparity between expectations of the information technology organization delivering the information technology services and expectations of the external customer using the services;

evaluating the customer's input data to the second engagement template; and outputting a maturity metric of each information technology service attribute.

2. The computerized method for evaluating the satisfaction and value of information technology services as perceived by the external customer using information technology services provided by an information technology organization of claim 1 wherein the service attribute to be measured by the first engagement template is the definition and understanding of the information technology service and the first engagement template presents one or more user interfaces to the external customer requesting input data on a plurality of focus comprising:

a definition of each information technology service provided by the information technology organization to the external customer;

whether levels of delivery of the information technology service to the external customer are defined and understood;

a scope of the information technology service delivered to the external customer;

a definition of the objectives of the information technology services delivered to the external customers; and whether the usage of the information technology service by the external customer is defined and clear.

3. The computerized method for evaluating the satisfaction and value of information technology services as perceived by the external customer using information technology services provided by an information technology organization of claim 2, further comprising:

the service attribute measured by the first engagement template is definition and understanding of the information technology service provided, and the focus area is the definition of the service, and the first engagement template presents one or more user interfaces to the external customer requesting input data on descriptions and considerations of the measured service attribute comprising:

if the information technology service is defined in terms of its respective deliverables, inputs and key activities;

delivery requirements of the information technology service;

the external customer preferences of the information technology service;

restrictions on the information technology service; and the first engagement template presents one or more user interfaces to obtain the external customer's input to obtain metrics on the service attribute of definition and understanding of the information technology service provided by the information technology to the external customer, the user interfaces requesting and providing for the external customer's input on whether:

the information technology service is defined through a service agreement;

the information technology service is defined thoroughly via service documentation; or the information technology service is a one page summary with little focus on ensuring understanding.

4. The computerized method for evaluating the satisfaction and value of information technology services as perceived by the external customer using information technology services provided by an information technology organization, as in claim 2, further comprising:

the service attribute measured by the first engagement template is definition and understanding of the information technology service provided, and the focus area is the levels of delivery, and the first engagement template presents one or more user interfaces to the external customer requesting input data on descriptions and considerations of the measured service attribute comprising:

is there a clear definition of the service levels;

is there a common understanding of the service and service levels between the information technology organization and the external customer;

is there an analysis of and balance between a plurality of needs of the external customer and a delivery capability of information technology organization;

are all of one or more policies clear and understood by the external customer and the information technology organization; and the first engagement template presents one or more user interfaces to obtain the external customer's input to obtain metrics on the focus area of whether the levels of delivery of the information technology service to the external customer are defined and understood, the user interfaces requesting and providing for the external customer's input on whether the external customer expects a problem to be resolved at all times but the information technology organization resolves a plurality of specific problems during regular working hours.

5. The computerized method for evaluating the satisfaction and value of information technology services as perceived by the external customer using information technology services provided by an information technology organization, of claim 2, further comprising:

the service attribute measured by the first engagement template is definition and understanding of the information technology service provided, and the focus area is the scope of the information technology service, and the first engagement template presents one or more user interfaces to the external customer requesting input data on descriptions and considerations of the measured service attribute comprising:

determining if inclusions and exclusions of the information technology services are clear, agreed to by the external customer and the information technology organization and any of a plurality of other parties, and if the inclusions and exclusions are documented; and the first engagement templates presents a user interface to the external customer of the example pertaining to the focus area of whether the levels of delivery of the information technology service to the external customer are defined and understood, whether new installation of information technology services is accomplished by means other than move/add/change requests.

6. The computerized method for evaluating the satisfaction and value of information technology services as perceived by the external customer using information technology services provided by an information technology organization, of claim 1 wherein the second engagement template further presents a user interface having a current measured maturity of at least one service attribute and a desired maturity level of the at least one service attribute determined by the external customer's input data to the first engagement template and second engagement template.

7. The computerized method for evaluating the satisfaction and value of information technology services as perceived by the external customer using information technology services provided by an information technology organization of claim 2, further comprising:

the service attribute measured by the first engagement template is definition and understanding of the information technology service provided, and the focus area is the service objectives, and the first engagement template presents one or more user interfaces to the external customer requesting input data on descriptions and considerations of the measured service attribute comprising:

if the objectives of the measured information technology services are specific, measurable, aggressive, realistic, and time-based; and the first engagement templates presents one or more user interfaces having examples to assist the external customer to provide input for processing metrics on the focus area of the objectives of the information technology services delivered to the external customers, the examples comprising:

delivering a help desk service to service an external customers needs is a bad example of defining the objectives of the information technology services; and responding to the external customer's move/add/change requests within one business day of receiving the request.

8. The computerized method for evaluating the satisfaction and value of information technology services as perceived by the external customer using information technology services provided by an information technology organization of claim 2, further comprising:

the service attribute measured by the first engagement template is definition and understanding of the information technology service provided, and the focus area is usage of the information technology service by the external customer, and the first engagement template presents one or more user interfaces to the external customer requesting input data on descriptions and considerations of the measured service attribute comprising:

if the information technology organization knows how and when the information technology service will by used by the external customer;

if the external customer knows how and when the information technology service is intended to be used; and the first engagement template presents one or more user interfaces to obtain the external customer's input to process metrics on the focus area of the usage of the information technology services delivered to the external customer, the relative usage of a workstation and whether installation of a workstation would be designed to support a large number of external customers.

9. The computerized method for evaluating the satisfaction and value of information technology services as perceived by the external customer using information technology services provided by an information technology organization of claim 1, wherein the second engagement template presents a user interface of a matrix comprising no more than twenty information technology service attributes to obtain the external customer's input data and process the input data to obtain metrics for a quick, general and/or a medium depth engagement model.

10. A computerized method of assessing an external customer's perception of the information technology services provided by an information technology organization, the steps of the method comprising:

retrieving a first engagement template and a second engagement template from an engagement template database connected to a terminal application used by the external customer though a network;

the first engagement template providing a plurality of user interfaces to an external customer to obtain input data of maturity of an information technology service using a matrix format for a plurality of attributes of the information technology service, the attributes comprising definition and understanding of the information technology service; a quality of the information technology service a marketing and communications of the information technology service, an achievement of results of the information technology service, the second engagement template presenting a plurality of user interfaces to an external customer to obtain input data of the customer's perception of maturity of each of the attributes of information technology services;

processing the customer's input data of the at least one attribute of information technology services to obtain a measured metric of maturity of the at least one attribute;

comparing the measured metric of maturity to different possible metrics of maturity of the information technology service attribute; and outputting a report with recommendations for improving the delivery of the at least one attribute of information technology services to the external customer based on the step of comparing the measured metric of maturity with the possible metrics of maturity.

11. The method of assessing an external customer's perception of information technology services provided by an information technology organization including the steps of claim 10 wherein the second engagement template presents a plurality of user interfaces to obtain the external customer's input data regarding the plurality of information technology services, the user interfaces presenting at least one focus area along with descriptions, considerations and an example for each focus areas to obtain the external customer's input data and process the input data to obtain metrics of the current maturity of information technology services provided by the information technology organization.

12. The method of assessing a customer's perception of information technology services including the steps of claim 10 wherein the first engagement template presents a user interface of detailed matrices in a workshop to obtain the external customer's input data and process the input data to obtain metrics of the current maturity of at least one service attribute and a desired level of maturity of the at least one service attribute and the step of outputting the report provides a user interface having a display comparing the metrics of the current maturity with the desired level of maturity for different aspects of information technology service delivery.

13. The method of assessing an external customer's perception of the information technology services provided by an information technology organization as in claim 10 wherein the first engagement template and the second engagement template present user interfaces to obtain the external customer's input data and process the input data to obtain metrics of an information technology service comprising data processing applications for inventory control.

14. The method of assessing an external customer's perception of the information technology services provided by an information technology organization as in claim 10 wherein the first engagement template and the second engagement template present user interfaces to obtain the external customer's input data and process the input data to obtain metrics of an information technology service comprising data processing applications for invention control.

15. The method of assessing an external customer's perception of the information technology services provided by an information technology organization as in claim 10 wherein the first engagement template and the second engagement template present user interfaces to obtain the external customer's input data and process the input data to obtain metrics of an information technology service comprising data processing applications for financial reporting.

16. The method of assessing an external customer's perception of the information technology services provided by an information technology organization as in claim 10 wherein the first engagement template and the second engagement template present user interfaces to obtain the external customer's input data and process the input data to obtain metrics of an information technology service comprising data processing applications for payroll.

17. The method of assessing an external customer's perception of the information technology services provided by an information technology organization as in claim 10 wherein the first engagement template and the second engagement template present user interfaces to obtain the external customer's input data and process the input data to obtain metrics of an information technology service comprising data processing applications for computer aided design and manufacturing (CADAM).

* * * * *